(12) United States Patent
Blanco et al.

(10) Patent No.: US 11,764,690 B2
(45) Date of Patent: Sep. 19, 2023

(54) POWER CONVERTER CONTROL WITH SNOOZE MODE

(71) Applicant: TEXAS INSTRUMENTS INCORPORATED, Dallas, TX (US)

(72) Inventors: Andres Arturo Blanco, Garland, TX (US); Ming Luo, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/713,107

(22) Filed: Apr. 4, 2022

(65) Prior Publication Data

US 2022/0231611 A1 Jul. 21, 2022

Related U.S. Application Data

(63) Continuation of application No. PCT/US2022/011760, filed on Jan. 10, 2022, which is a continuation of application No. 17/347,119, filed on Jun. 14, 2021, now abandoned.

(60) Provisional application No. 63/136,276, filed on Jan. 12, 2021.

(51) Int. Cl.
*H02M 3/335* (2006.01)
*H02M 1/00* (2006.01)
*H02M 1/08* (2006.01)

(52) U.S. Cl.
CPC ..... *H02M 3/33569* (2013.01); *H02M 1/0035* (2021.05); *H02M 1/0041* (2021.05); *H02M 1/083* (2013.01)

(58) Field of Classification Search
CPC ................................................ H02M 3/33569
USPC ......................................................... 327/100
See application file for complete search history.

(56) References Cited

U.S. PATENT DOCUMENTS

| 2013/0173980 | A1 | 7/2013 | Xi |
| 2014/0091778 | A1 | 4/2014 | Chen |
| 2015/0207420 | A1 | 7/2015 | Wang et al. |
| 2016/0156268 | A1 | 6/2016 | Thomas et al. |
| 2017/0353122 | A1* | 12/2017 | Su ..................... H02M 3/33523 |
| 2018/0183324 | A1* | 6/2018 | Cao ........................ H02M 1/32 |
| 2021/0091671 | A1* | 3/2021 | Fukushima ......... H02M 3/1588 |

* cited by examiner

OTHER PUBLICATIONS

Search Report for PCT Application No. PCT/US2022/011760, the international search report dated Apr. 14, 2022 (Apr. 14, 2022), 1 page.

*Primary Examiner* — Tomi Skibinski (74) *Attorney, Agent, or Firm* — Charles F. Koch; Frank D. Cimino (57) ABSTRACT

A control signal generator includes an error amplifier, a first comparator, a second comparator, a logic circuit and a pulse generator. The error amplifier has a first output, a first input, a second input and a first snooze input. The first comparator has a second output, a third input and a fourth input. The third input is coupled to the first output. The second comparator has a third output, a fifth input, a sixth input and a second snooze input. The fifth input is coupled to the third input. The logic circuit has a fourth output and logic circuit inputs, including a first logic circuit input coupled to the second output. The pulse generator has a fifth output and a seventh input. The seventh input is coupled to the fourth output. A snooze mode controller has a sixth output coupled to the first snooze input and the second snooze input.

20 Claims, 8 Drawing Sheets

FIG. 8

POWER CONVERTER CONTROL WITH SNOOZE MODE

CROSS-REFERENCE TO RELATED APPLICATIONS

This application is a continuation of (and claims priority to) PCT Patent Application No. PCT/US2022/011760 filed Jan. 10, 2022, which is a continuation of (and claims priority to) U.S. patent application Ser. No. 17/347,119 filed Jun. 14, 2021, which claims priority to U.S. Provisional Patent Application No. 63/136,276 filed Jan. 12, 2021, the entireties of which are incorporated herein by reference.

BACKGROUND

A switched mode power supply (SMPS) transfers power from an input power source to a load by switching one or more power transistors or other switching elements coupled through a switch node/terminal to an energy storage element (such as an inductor, an inductance of a transformer, and/or a capacitor), which is capable of coupling to the load. The power transistors can be included in a power converter that includes, or is capable of coupling to, the energy storage element. A SMPS can include a SMPS controller to provide one or more gate drive signals to the power transistor(s).

The input voltage to the converter may be greater than, less than, or equal to the output voltage. If the input voltage is greater than the output voltage, the converter may be referred to as a "step-down" converter/regulator or a "buck converter." If the input voltage is less than the output voltage, the converter/regulator may be referred to as a "step-up" converter/regulator or a "boost converter." If the converter/regulator can perform both step-up and step-down functions, then it may be referred to as a "buck-boost converter."

SUMMARY

In an example, a control signal generator includes an error amplifier, a first comparator, a second comparator, a logic circuit and a pulse generator. The error amplifier has a first output, a first input, a second input and a first snooze input. The first comparator has a second output, a third input and a fourth input. The third input is coupled to the first output. The second comparator has a third output, a fifth input, a sixth input and a second snooze input. The fifth input is coupled to the third input. The logic circuit has a fourth output and logic circuit inputs, including a first logic circuit input coupled to the second output. The pulse generator has a fifth output and a seventh input. The seventh input is coupled to the fourth output. A snooze mode controller has a sixth output coupled to the first snooze input and the second snooze input.

DETAILED DESCRIPTION

A switched mode power supply (SMPS) controller switches power transistor(s) to form circuit arrangements with energy storage element(s) to supply a load current to a load and/or to an output capacitor to maintain a regulated output voltage. Alternatively, though not shown herein, at least some of the power transistors are implemented as passive switches, such as diodes. A power transistor can be coupled through the switch node/terminal to an energy storage inductor during charging and/or discharging switching states of a power converter. In at least some examples, the energy storage inductor is switched by the SMPS controller between charge and discharge switching states to supply inductor current (e.g., current through the energy storage inductor) to the load and to the output capacitor to maintain the regulated output voltage. As described above, in at least some examples, one or more of the power transistors are replaced by passive switches that react based on characteristics of a received input signal and are not switched by the SMPS controller. In some examples, a SMPS can be configured for operation as a constant current source with an energy storage element but with no output capacitor. Power converters periodically repeat sequences of switching states (such as "on" and "off" states). A single on/off cycle may be called a switching cycle.

The power transistors can be implemented as field effect transistors (FETs), such as metal-oxide field effect transistors (MOSFETs) or any other suitable solid-state transistor devices (e.g., such as bipolar junction transistors (BJTs)). Power converters can be of various architectures, each having certain functionality, such as buck, boost, and buck-boost, among others. In this description, a power converter of boost topology is described. However, this description is equally applicable to power converters of buck and/or buck-boost (inverting and/or non-inverting) topologies. Also, this description may be related to other circuit architectures that provide a regulated output voltage (VOUT).

To control the power converter, a SMPS controller provides a control signal based on a mode of control for which the SMPS controller is implemented. The mode of control may be current mode control, voltage mode control, valley control, peak control, average control, etc. In this description, valley control is described. However, this description is equally applicable to other modes of control. The SMPS controller may provide the control signal to a driver, or to a logic circuit that is coupled to the driver, and the driver provides gate control signals to gates of the power transistors to control a mode of operation of the power converter. The gate control signal received by a power transistor controls a switching state of the power transistor, such as whether the power transistor is in a conductive state (e.g., turned on) or in a non-conductive state (e.g., turned off). Each state of a power converter involves a specific combination of power transistors that are in conducting states and power transistors that are in non-conducting states. To change the mode of operation of the power converter, the SMPS controller modifies the sequence of switching states that it commands the power transistors to assume. In at least some examples, the SMPS controller includes hardware component arrangements such that values of the control signals are determined based on these hardware component arrangements.

Some use cases for a SMPS benefit from a reduced quiescent current. A quiescent current is a current consumed by the SMPS itself, independent of current provided by the SMPS to a load. For example, the quiescent current may be a current consumed by the SMPS in no load, or light (e.g., low) load current conditions. If a power source from which the SMPS draws current is a depletable power source, such as a battery, reducing the quiescent current of the SMPS may reduce power draw from the power source and increase a usable lifespan of the power source before recharging or replacement. If the power source from which the SMPS draws current is a non-depletable power source, such as mains power or power derived from mains power (e.g., such as output from a transformer, other power converter, etc.), reducing the quiescent current of the SMPS may reduce a cost associated with using the SMPS by causing the SMPS to consume less energy.

Aspects of this description relate to a SMPS that implements a sleep mode. The sleep mode may decrease a clock signal (SNOOZE_CLK) on which monitoring of VOUT is based. For example, responsive to VOUT remaining within a regulation for a programmed number of cycles, or periods, such as of an oscillator signal (CLK), the SMPS may determine that a rate of decrease in value of VOUT is such that SNOOZE_CLK may also be slowed. By slowing SNOOZE_CLK a quiescent current of the SMPS may be reduced in comparison to applications that do not slow SNOOZE_CLK.

In at least some examples, SNOOZE_CLK may be determined as a combination of multiple signals. For example, SNOOZE_CLK may be determined by performing a logical OR operation between multiple signals. The signals may include a zero-crossing detection signal (ZCD), CLK, and a fast drop detection signal (FDD). In at least some examples, ZCD is asserted in a valley mode control system responsive to a voltage representative of an inductor current of a power converter reaching zero before it reaches a value of an error signal (Vea) provided by an error amplifier based on a reference signal (Vref) and a feedback signal (Vfb) that is based on VOUT. CLK may be provided by an oscillator with an adjustable period programmed according to an application or use case of the SMPS. In at least some examples, FDD may be provided by a circuit that monitors a value of VOUT and provides a periodic signal having a frequency proportional to a rate at which VOUT is decreasing in value. Conversely, in some systems, FDD may be provided by a circuit that monitors a value of VOUT and provides a periodic signal having a frequency proportional to a rate at which VOUT is increasing in value. In such an example, FDD may be renamed as a fast rise detection signal. Responsive to SNOOZE_CLK being asserted, the SMPS may enter a snooze or sleep mode.

In some examples, the error amplifier is configured to cause the SMPS to provide a pulse of current responsive to the error amplifier receiving a signal to cause the error amplifier to exit the snooze mode. The error amplifier may further include a compensated signal path and an uncompensated signal path, where the uncompensated signal path responds more quickly to a transient change in a signal value than does the compensated signal path.

Figure 1:
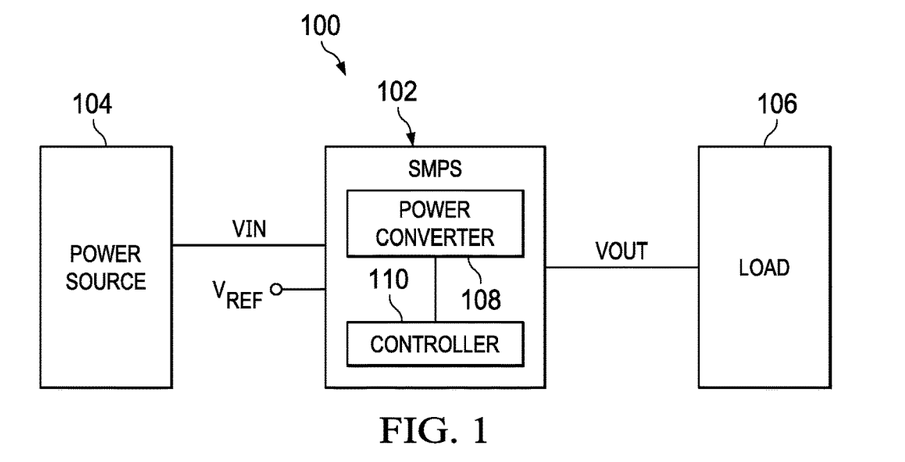
FIG. 1 is a block diagram of an example system.

FIG. 1 is a block diagram of an example system 100. In at least some examples, the system 100 is representative of any electronic device that includes a SMPS 102 that is configured to switch power from a power source 104 to a load 106. For example, the system 100 may be an Internet of Things (IoT) device, a sensor, or any other suitable electronic device. In at least some examples, the power source 104 is a battery. In some examples, the SMPS 102 includes a power converter 108 and a controller 110. The controller 110 is configured to control the power converter 108 to switch power provided by the power source 104 to the load 106. For example, the controller 110 may receive Vref and control the power converter 108 to provide VOUT to the load 106, where VOUT has a value approximately equal to Vref while VOUT is in regulation.

In an example of the system 100, the power source 104 is coupled to the power converter 108, which is coupled to the load 106 and the controller 110. The power converter 108 is configured to receive VIN from the power source 104 and provide VOUT to the load 106 based on VIN and control exerted on the power converter 108 by the controller 110. The controller 110 may receive Vref and provide the power converter 108 with a control signal to regulate VOUT to have a value approximately equal to Vref. In some examples, the controller 110 provides the control signal to the power converter 108. In other examples, the controller 110 provides the control signal to a driver (not shown) that drives the power converter 108 based on the control signal.

The controller 110 may include a snooze mode. In at least some examples, the snooze mode may reduce a quiescent current draw of the SMPS 102 from the power source 104 in comparison to the SMPS 102 while the snooze mode is not active. The snooze mode may be activated responsive to the SMPS 102 determining that VOUT is a threshold amount greater than a target voltage (e.g., such as represented by Vref) has remained in regulation for a programmed number of cycles of CLK. In at least some examples, while the SMPS 102 is in the snooze mode, the controller 110 does not monitor a value of VOUT to determine the value of VOUT, or a signal representative of VOUT, such as Vfb, with respect to Vref. Responsive to expiration of SNOOZE_CLK, the controller 110 may determine a value of VOUT (or Vfb) with respect to Vref and control the power converter 108 based on the determination. In at least some examples, SNOOZE_CLK is programmable, such as to have a value based on a rate of change of VOUT (e.g., a frequency proportional to the rate of change of VOUT), a fixed frequency, or a value of an inductor current of an inductor (not shown) of the power converter 108. As described above, SNOOZE_CLK may be controlled to have a lower frequency responsive to VOUT having remained in regulation for a programmed number of cycles of CLK. VOUT having remained in regulation for the programmed number of cycles of CLK, in at least some examples, may indicate that VOUT is slowly changing in value. SNOOZE_CLK may be controlled to have a higher frequency responsive to VOUT changing in value at a rate that exceeds a programmed rate of change. In at least some examples, decreasing the frequency of SNOOZE_CLK responsive to VOUT having remained in regulation for a programmed number of cycles of CLK reduces a quiescent current draw of the SMPS 102.

Figure 2:
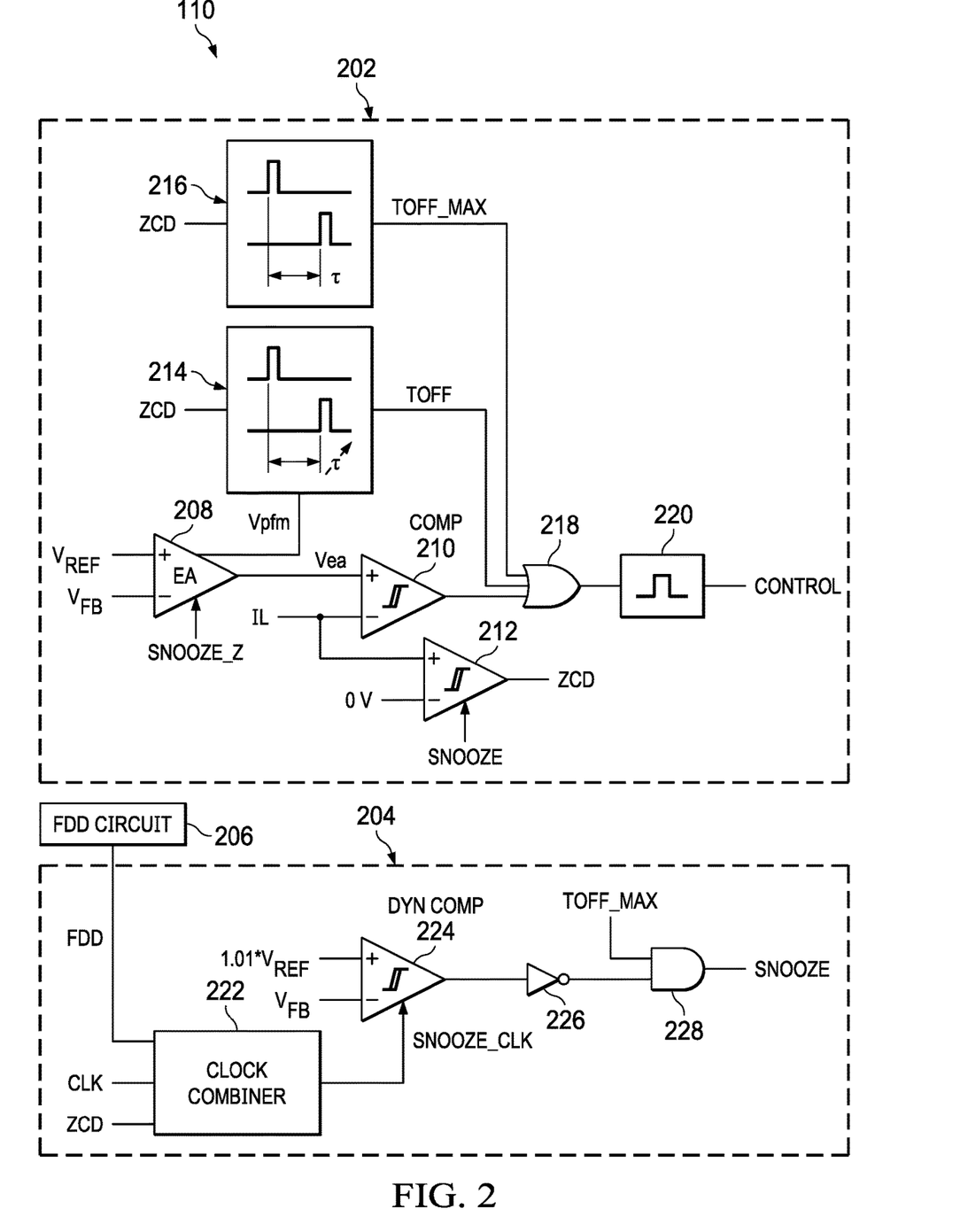
FIG. 2 is a block diagram of an example controller.

FIG. 2 is a block diagram of an example controller 110. While shown as a component of the SMPS 102, in various other examples the controller 110 may be a component of another apparatus, circuit, or system. In at least some examples, the controller 110 includes a control signal generator 202, a snooze mode controller 204, and a FDD circuit 206. In at least some examples, the controller 110 receives Vref, Vfb, and a signal representative of a current of the power converter 108 (IL) and provides a control signal (CONTROL) based at least partially on Vref, Vfb, and IL. In at least some examples, other controls signals are derived based on a value of CONTROL, such as being a logical inversion of a value of CONTROL, etc. In at least some examples, the control signal generator 202 includes an error amplifier 208, a comparator 210, a comparator 212, a timer 214, a timer 216, a logic circuit 218, and a pulse generator 220. In at least some examples, the snooze mode controller 204 includes a clock combiner 222, a comparator 224, a logic circuit 226, and a logic circuit 228.

In at least some example architectures of the control signal generator 202, the error amplifier 208 is configured to receive Vref at a first input (e.g., a positive or non-inverting input) and receive Vfb at a second input (e.g., a negative or inverting input). In some examples, Vfb has a value determined based on VOUT (e.g., such that Vfb is an output signal of a voltage divider having VOUT as an input signal). In other examples, Vfb has substantially a same value as VOUT (e.g., in some implementations, VOUT is used as Vfb). An output of the error amplifier 208 is coupled to a first input (e.g., a positive or non-inverting input) of the comparator 210. In some examples, the error amplifier 208 has a snooze input configured to receive a snooze control signal (SNOOZE) and which is turned-off (e.g., non-functional) responsive to SNOOZE being asserted. The comparator 210 is configured to receive IL at a second input (e.g., a negative or inverting input). The comparator 212 is configured to receive IL at a first input (e.g., a positive or non-inverting input) and a signal having a value of approximately 0 volts (V) at a second input (e.g., a negative or inverting input). In some examples, the comparator 212 is a gated comparator that has a snooze input configured to receive SNOOZE and which is turned-off (e.g., non-functional) responsive to SNOOZE being asserted. In at least some examples, one or both of the error amplifier 208 and/or the comparator 212 receives an inverse of SNOOZE (indicated as SNOOZE_Z). SNOOZE_Z may be provided according to any suitable process or hardware architecture. In at least one example, though not shown herein, SNOOZE_Z is provided by an inverter circuit 230 that receives SNOOZE as an input. In such examples, the inverter circuit may be coupled between the output of the logic circuit 228 and the snooze input of the error amplifier 208. In at least some examples, the timer 214 is configured to provide a signal TOFF and the timer 216 is configured to provide a signal TOFF_MAX. In at least some examples, TOFF is asserted responsive to a sum of an off time of the power converter 108 and any programmed gap or delay time between control of power transistors of the power converter 108 expiring. In at least some examples, TOFF_MAX is asserted responsive to expiration of a maximum off time for the power converter 108. The timer 214 has an input coupled to the second output of the error amplifier 208. For example, responsive to the timer 214 receiving ZCD having an asserted value, the timer 214 may being counting and provide TOFF having an asserted value a programmed amount of time (in some examples, such as about 10 us) after receiving ZCD having the asserted value. Similarly, responsive to the timer 216 receiving ZCD having an asserted value, the timer 216 may being counting and provide TOFF_MAX having an asserted value a programmed amount of time after receiving ZCD having the asserted value. In at least some examples, providing of TOFF is further based on Vea, such as being inversely proportional to a signal Vpfm, provided by the error amplifier 208 as described below. The comparator 210, the timer 214, and the timer 216 each have outputs coupled to inputs of the logic circuit 218. The logic circuit 218 has an output coupled to an input of the pulse generator 220, which has an output at which CONTROL is provided. In at least some examples, the logic circuit 218 performs a logical OR function among its input signals to provide an output signal that is asserted responsive to any one or more of the input signals of the logic circuit 218 being asserted.

In at least some example architectures of the snooze mode controller 204, the clock combiner 222 has a first input coupled to the output of the comparator 212 to receive ZCD, a second input coupled to an output of an oscillator (not shown) to receive CLK, and a third input coupled to an output of the FDD circuit 206. An output of the snooze mode controller 204, at which SNOOZE_CLK is provided, is coupled to the comparator 224. The comparator 224 is configured to receive Vref multiplied by a scaling factor at a first input (e.g., a positive or non-inverting input) and receive Vfb at a second input (e.g., a negative or inverting input). In at least some examples, the scaling factor is 1.01. In other examples, the scaling factor is any suitable value. An output of the comparator 224 is coupled to an input of the logic circuit 226. An output of the logic circuit 226 is coupled to an input of the logic circuit 228 which has another input coupled to the output of the timer 216 and an output at which SNOOZE is provided, coupled to the error amplifier 208. In at least some examples, the logic circuit 226 is an inverter such that a value of a signal provided at the output of the logic circuit 226 is a logical inversion of a value provided at the input of the logic circuit 226. In at least some examples, the logic circuit 228 performs a logical AND function among its input signals to provide an output signal that is asserted responsive to each of the input signals of the logic circuit 228 being asserted.

In an example of operation of the controller 110, the error amplifier 208 amplifies a difference between a value of Vref and a value of Vfb to provide Vea. The comparator 210 compares Vea to IL and, responsive to IL being lesser in value than Vea, provides an output signal COMP having an asserted value. Responsive to assertion of COMP, the logic circuit 218 provides an asserted signal to cause the pulse generator 220 to provide CONTROL having an asserted value for a programmed on time determined by the pulse generator 220. In at least some examples, a high side power transistor (not shown) of the power converter 108 is controlled to turn off and a low side power transistor (not shown) of the power converter 108 is controlled to turn on responsive to assertion of CONTROL. In at least some examples, responsive to IL decreasing to zero before it increases to reach Vea, the comparator 212 asserts ZCD. In at least some examples, responsive to assertion of ZCD, the high side power transistor of the power converter 108 is controlled to turn off, such as via assertion of TOFF or TOFF_MAX. Responsive to ZCD decreasing in value to zero before it increases to reach Vea, the controller 110 controls the power converter 108 to operate according to pulse frequency modulation (PFM) in which an off time of the power converter 108 is controlled based on Vea.

While the power converter 108 is operating according to PFM, the off time of the power converter 108 may be a function of Vea. The timer 214 may determine the off time and provide TOFF, based on Vea and/or any other suitable signals or considerations, according to any suitable process or using any suitable hardware architecture, the scope of which is not limited herein. In at least some examples, the timer 214 may determine the off time based on Vea and a gap time that defines an amount of time to wait (e.g., a gap time) after a high side power transistor of the power converter 108 is turned off before turning on a low side power transistor of the power converter 108. Responsive to expiration of a sum of the gap time and the off time determined based on Vea, the timer 214 may provide TOFF having an asserted value. In at least some examples, the off time has a value less than or equal to about 10 microseconds. In at least some examples, the timer 216 may determine the maximum off time based at least partially on VIN and VOUT. Responsive to expiration of the maximum off time, the timer 216 may provide TOFF_MAX having an asserted value. In at least one example, the maximum off time is approximately equal to VIN/L*T_HS*T_LS/I_OUT, where L is an inductance of an inductor of the power converter 108, T_HS is a time that the high side power transistor of the power converter 108 is on, T_LS is a time that the low side power transistor of the power converter 108 is on, and I_OUT is a load current of the power converter 108. In at least some examples, responsive to assertion of any of TOFF_MAX, TOFF, or COMP, the logic circuit 218 controls the pulse generator 220 to provide CONTROL having an asserted value.

In at least some examples, under heavy load conditions, the controller 110 may control the power converter 108 according to constant on time valley current control using pulse width modulation (PWM). As used herein, heavy load conditions may exist if the load 106 is drawing greater than 100 milliamps (mA) of current from the power converter 108. Under medium load conditions, the controller 110 may control the power converter 108 according to constant on time PFM with a variable off time. As used herein, medium load conditions may exist if the load 106 is drawing between about 15 mA and about 100 mA of current from the power converter 108. Under light load conditions, the controller 110 may control the power converter 108 to operate in a burst mode with the snooze mode described herein active between bursts. As used herein, light load conditions may exist if the load 106 is drawing less than about 15 mA of current from the power converter 108.

In an example of operation of the snooze mode controller 204, the clock combiner 222 provides SNOOZE_CLK having an asserted value corresponding to an asserted value in ZCD, CLK, or FDD. For example, in at least one implementation the clock combiner 222 performs a logical OR operation among ZCD, CLK, and FDD, providing SNOOZE_CLK having an asserted value responsive to any one or more of ZCD, CLK, or FDD having an asserted value. In other examples, the clock combiner 222 provides SNOOZE_CLK having an asserted pulse each time a rising edge is detected in ZCD, CLK, or FDD. The comparator 224 may be clocked by SNOOZE_CLK such that the comparator 224 may compare its input signals and provide an output signal only while SNOOZE_CLK is asserted. While SNOOZE_CLK is deasserted, in at least some examples, the comparator 224 may be turned off and non-functional. In at least some examples, the comparator 224 may be referred to as a clocked dynamic comparator.

Responsive to SNOOZE_CLK becoming asserted, the comparator 224 may compare its input signals (e.g., scaled Vref and Vfb) and provide an output signal. In some examples, Vref is scaled to provide hysteresis to the snooze mode controller 204 to prevent the snooze mode controller 204 from causing the controller 110 to enter and exit the snooze mode frequency, such as due to transient signal noise. In at least some examples, an asserted output signal provided by the comparator 224 may indicate that VOUT has decreased in value to be within about one percent of a programmed value for VOUT and the controller 110 should control the power converter 108 to provide a burst of current to the load 106. In at least some examples, responsive to the output signal provided by the comparator 224 being asserted, SNOOZE may be deasserted and the SMPS 102 may be taken out of the snooze mode. Conversely, responsive to the output signal provided by the comparator 224 being deasserted and TOFF_MAX being asserted, SNOOZE may be asserted and the SMPS 102 may be placed, or maintained, in the snooze mode. Responsive to deassertion of SNOOZE, the error amplifier 208 and the comparator 212 may turn on and become functional to cause the controller 110 to control the power converter 108 to deliver current to the load 106.

In an example of operation of the FDD circuit 206, a rate of change of VOUT is monitored and FDD is provided based on that monitoring. For example, the FDD circuit 206 may provide FDD as a clock signal having a frequency proportional to the rate of change of VOUT. Responsive to the rate of change of VOUT increasing, the frequency of FDD may increase and responsive to the rate of change of VOUT decreasing, the frequency of FDD may decrease until the rate of change of VOUT is too small to be detected by the FDD circuit 206. In various examples, the FDD circuit 206 may be implemented according to any suitable FDD circuit architecture, the scope of which is not limited herein.

Figure 3:
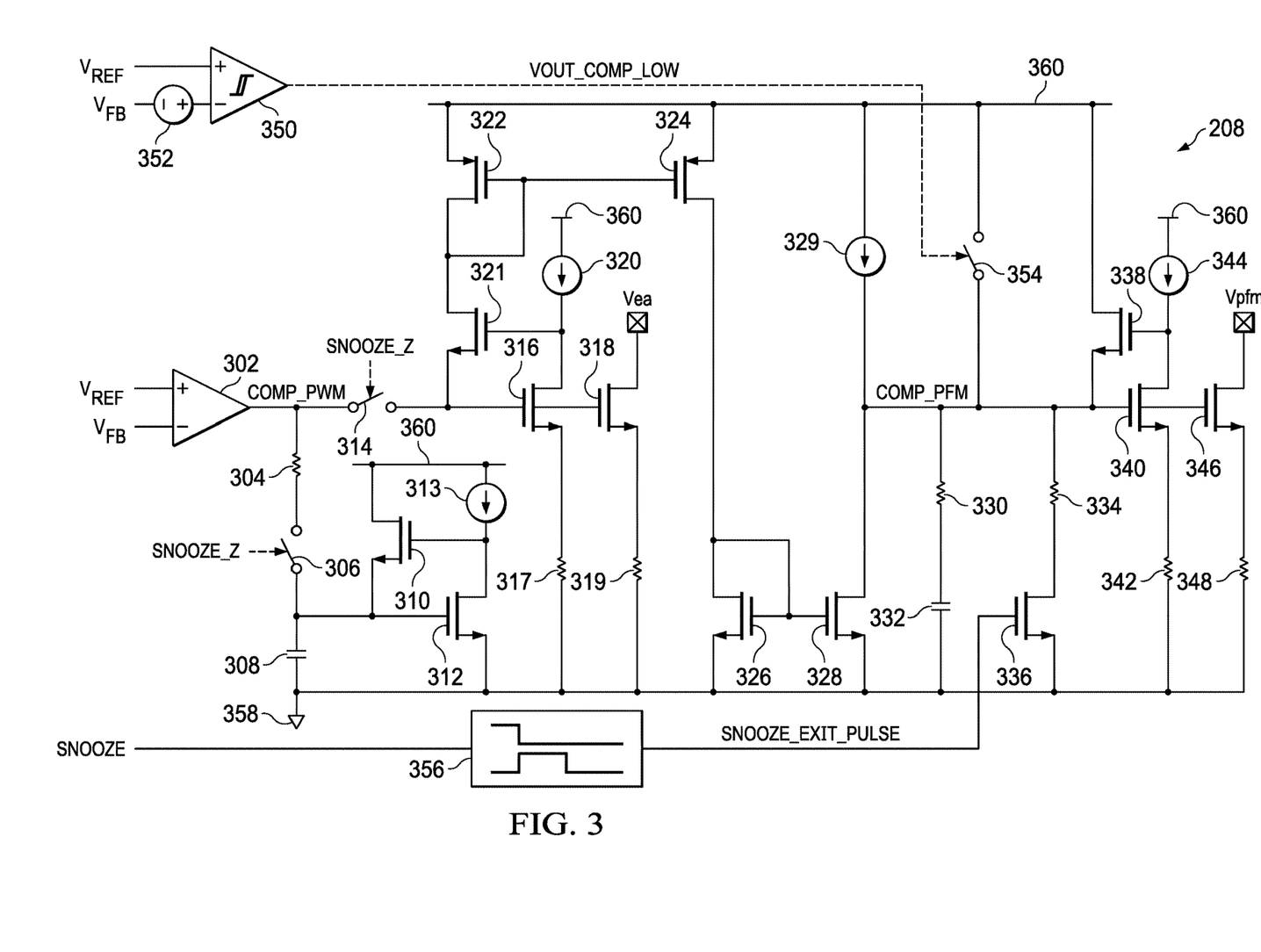
FIG. 3 is a schematic diagram of an example error amplifier.

FIG. 3 is a schematic diagram of an example error amplifier 208. While shown as a component of the controller 110, in various other examples the error amplifier 208 may be a component of another apparatus, circuit, or system. In at least some examples, the error amplifier 208 includes an amplifier 302, a resistor 304, a switch 306, a capacitor 308, a transistor 310, a transistor 312, a current source 313, a switch 314, a transistor 316, a resistor 317, a transistor 318, a resistor 319, a current source 320, a transistor 321, a transistor 322, a transistor 324, a transistor 326, a transistor 328, a current source 329, a resistor 330, a capacitor 332, a resistor 334, a transistor 336, a transistor 338, a transistor 340, a resistor 342, a current source 344, a transistor 346, a resistor 348, a comparator 350, an offset voltage source 352, a switch 354, and a pulse generator 356.

In an example architecture of the error amplifier 208, the amplifier 302 has a first input (e.g., a positive or non-inverting input) configured to receive Vref and a second input (e.g., a negative or inverting input) configured to receive Vfb. The amplifier 302 further has first and second outputs. In at least some examples, the amplifier 302 is a differential amplifier. The resistor 304 is coupled at a first terminal to a first output of the amplifier 302 and at a second terminal to a top plate of the capacitor 308 through the switch 306. In at least some examples, the switch 306 is a normally-open switch configured to receive and be controlled by SNOOZE_Z. In other examples, the switch 306 may be a normally-closed switch configured to receive and be controlled by SNOOZE. A bottom plate of the capacitor 308 is adapted to be coupled to ground 358. The transistor 310 has a source coupled to the top plate of the capacitor 308, a drain adapted to be coupled to a voltage source 360, and a gate. The transistor 312 has a gate coupled to the top plate of the capacitor 308, a source adapted to be coupled to ground 358, and a drain coupled to the gate of the transistor 310. The current source 313 is adapted to be coupled between the voltage source 360 and the gate of the transistor 310. The switch 314 has a first terminal coupled to the first output of the amplifier 302 and a second terminal. In at least some examples, the switch 314 is a normally-open switch configured to receive and be controlled by SNOOZE_Z. In other examples, the switch 314 may be a normally-closed switch configured to receive and be controlled by SNOOZE. The transistor 316 has a gate coupled to the second terminal of the switch 314, a source coupled through the resistor 317 to ground 358, and a drain. The transistor 318 has a gate coupled to the second terminal of the switch 314, a source coupled through the resistor 319 to ground 358, and a drain at which Vea is provided. The current source 320 is adapted to be coupled between the voltage source 360 and the drain of the transistor 316.

The transistor 321 has a gate coupled to the drain of the transistor 316, a source coupled to the gate of the transistor 316, and a drain. The transistor 322 has a drain and a gate coupled to the drain of the transistor 321, and a source adapted to be coupled to the voltage source 360. The transistor 324 has a gate coupled to the gate of the transistor 322, a source adapted to be coupled to the voltage source 360, and a drain. The transistor 326 has a drain and a gate coupled to the drain of the transistor 324, and a source adapted to be coupled to ground 358. The transistor 328 has a gate coupled to the gate of the transistor 326, a source adapted to be coupled to ground 358, and a drain. The current source 329 is adapted to be coupled between the voltage source 360 and the drain of the transistor 328. The resistor 330 is coupled between the drain of the transistor 328 and a top plate of the capacitor 332. A bottom plate of the capacitor 332 is adapted to be coupled to ground 358. The resistor 334 is coupled between the drain of the transistor 328 and a drain of the transistor 336. The transistor 336 further has a source adapted to be coupled to ground 358 and a gate. The transistor 338 has a source coupled to the drain of the transistor 328, a drain adapted to be coupled to the voltage source 360, and a gate. The transistor 340 has a gate coupled to the drain of the transistor 328, a source adapted to be coupled to ground 358 through the resistor 342, and a drain coupled to the gate of the transistor 338. The current source 344 is adapted to be coupled between the voltage source 360 and the drain of the transistor 340. The transistor 346 has a gate coupled to the drain of the transistor 328, a source adapted to be coupled to ground 358 through the resistor 348, and a drain at which an output of the error amplifier 208 is provided. The comparator 350 has a first input (e.g., a positive or non-inverting input) configured to receive Vref, a second input (e.g., a negative or inverting input), and an output. The offset voltage source 352 is coupled to the second input of the comparator 350 and provides a voltage offset to Vfb. The switch 354 is adapted to be coupled between the voltage source 360 and the drain of the transistor 328. In at least some examples, the switch 354 is a normally-open switch configured to receive and be controlled by an output signal of the comparator 350. The pulse generator 356 has an input configured to receive SNOOZE and an output coupled to the gate of the transistor 336.

In an example of operation of the error amplifier 208, the amplifier 302, which may be any suitable transconductance amplifier, receives Vref and Vfb and amplifies a difference in value between Vref and Vfb to provide an output signal COMP_PWM. The resistor 304 and the capacitor 308 provide compensation to maintain stability in a PWM loop portion of the error amplifier 208. The amplifier 302 drives the transistor 318 to provide Vea at the drain of the transistor 318. A clamp including the transistor 316, resistor 317, current source 320, and transistor 321 maintains the value of COMP_PWM at a minimum, or clamped, voltage irrespective of values of Vref or Vfb. The transistors 322, 324, 326, and 328 together mirror a current from the source of the transistor 321 to the drain of the transistor 328, to provide COMP_PFM, while the clamp described above is engaged (e.g., such as if COMP_PWM would otherwise have a value less than the clamped voltage in the absence of the clamp). The resistor 330 and the capacitor 332 provide compensation to maintain stability in a PFM loop portion of the error amplifier 208. A clamp including the transistor 338, transistor 340, resistor 342, and current source 344, maintains the value of COMP_PFM at a minimum, or clamped, voltage irrespective of values of Vref or Vfb. The transistor 346 is driven based on a value of COMP_PFM to provide an output signal Vpfm at the drain of the transistor 346. While the error amplifier 208 is not in the snooze mode, the capacitor 308, which may be a compensation capacitor, charges based on COMP_PWM. In at least some examples, responsive to the error amplifier 208 entering the snooze mode, the switch 306 opens such that a voltage is held on the capacitor 308 while in the snooze mode. A clamp formed by the transistor 310, transistor 312, and current source 313 may maintain the voltage is held on the capacitor 308 while in the snooze mode at a minimum, or clamped, voltage. Also responsive to the error amplifier 208 entering the snooze mode, the switch 314 opens such that the output of the amplifier 302 is electrically de-coupled from the gate of the transistors 316 and 318 and from the source of the transistor 321.

In at least some examples, the pulse generator 356 is configured to receive SNOOZE and provide a voltage pulse (SNOOZE EXIT PULSE) having a programmed width responsive to a falling edge of SNOOZE. In at least some examples, the programmed width is about 3 microseconds. Responsive to assertion of SNOOZE EXIT PULSE for the pulsed duration, and while SNOOZE EXIT PULSE is asserted, the transistor 336 may become conductive, pulling down the gate of the transistor 340 such that a signal COMP_PFM provided at the gate of the transistor 340 is approximately equal to a voltage provided at ground 358. In at least some examples, responsive to the gate of the transistor 340 being pulled down, the error amplifier 208 causes the controller 110 to control the power converter 108 according to PFM control. In at least some examples, the transistor 336 pulling down the gate of the transistor 340 may cause a single discontinuous conduction mode (DCM) pulse to be provided to the power converter 108 as a gate control signal. In some examples, a value of VOUT_COM_LOW may determine whether the error amplifier 208 begins operation in PWM mode or PFM mode following assertion of SNOOZE EXIT PULSE. For example, responsive to the comparator 350 determining that Vref is lesser in value than Vfb plus an offset provided by the offset voltage source 352, the comparator 350 provides VOUT_COM_LOW having an asserted value. In at least some examples, the offset is about one percent of Vref (e.g., such that if Vfb decreases to be less than ninety-nine percent of Vref, VOUT_COMP_LOW is asserted). Responsive to VOUT_COMP_LOW having an asserted value, the switch 354 may be closed, pulling up the gate of the transistor 340 such that a signal COMP_PFM provided at the gate of the transistor 340 is approximately equal to a voltage provided at the voltage source 360 and the error amplifier 208 provides Vea based on PWM control (e.g., entering a high-current mode in which PFM mode control is skipped). In other examples, such as if Vref is not lesser in value than Vfb plus the offset provided by the offset voltage source 352, the DCM pulse may be provided by another circuit, such as a logic circuit, described above, that may receive an output of the controller 110 and/or SNOOZE and provide gate control signals for use in driving the power transistors of the power converter 108. For example, in some implementations, irrespective of an output of the error amplifier 208 or controller 110, the logic circuit may provide the DCM pulse responsive to detection by the logic circuit of a falling edge transition in SNOOZE.

Figure 4:
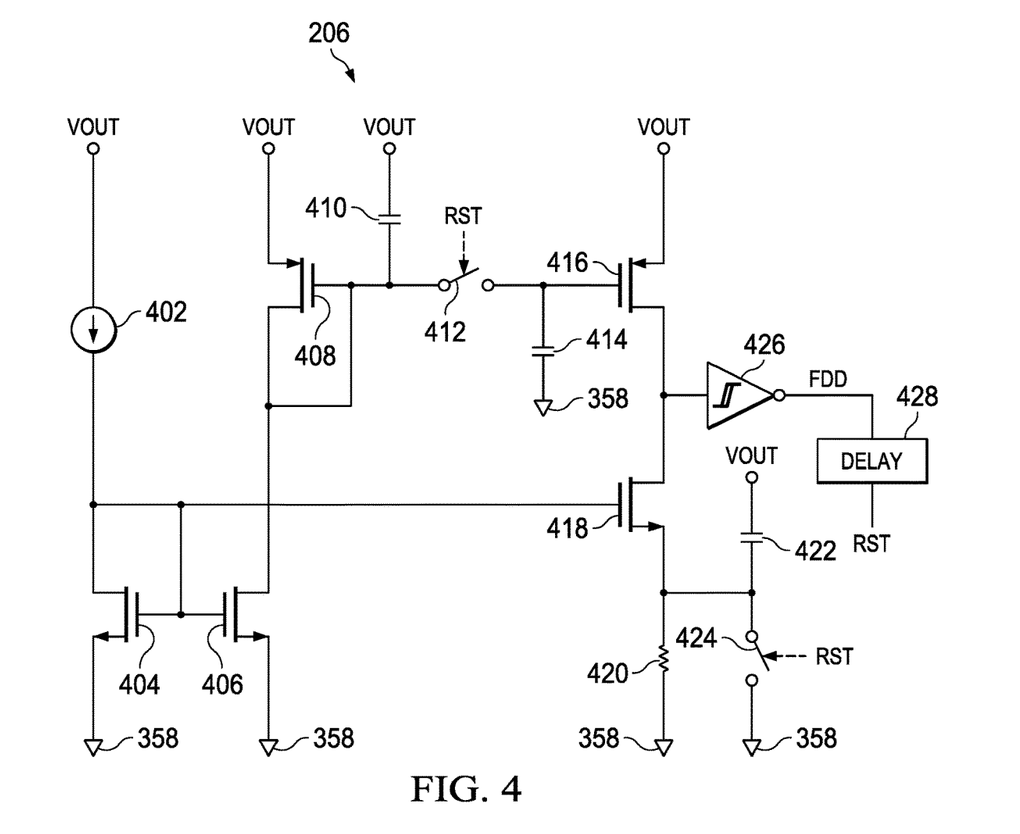
FIG. 4 is a schematic diagram of an example fast drop detection circuit.

FIG. 4 is a schematic diagram of an example FDD circuit 206. While shown as a component of the controller 110, in various other examples the FDD circuit 206 may be a component of another apparatus, circuit, or system. Also, while shown having a certain architecture, in various examples the FDD circuit 206 may have any architecture suitable for performing the functions described in this description. In at least some examples, the FDD circuit 206 includes a current source 402, a transistor 404, a transistor 406, a transistor 408, a capacitor 410, a switch 412, a capacitor 414, a transistor 416, a transistor 418, a resistor 420, a capacitor 422, a switch 424, a logic circuit 426, and a delay circuit 428.

In an example architecture of the FDD circuit 206, the current source 402 is adapted to be coupled between an output of the power converter 108 and a drain of the transistor 404. The transistor 404 has a gate coupled to the drain of the transistor 404 and a source adapted to be coupled to ground 358. The transistor 406 has a gate coupled to the gate of the transistor 404, a source adapted to be coupled to ground 358, and a drain. The transistor 408 has a drain and a gate coupled to the drain of the transistor 406, and a source adapted to be coupled to the output of the power converter 108. The capacitor 410 is adapted to be coupled between the output of the power converter 108 and the gate of the transistor 408. The switch 412 is coupled between the gate of the transistor 408 and a gate of the transistor 416. The capacitor 414 is adapted to be coupled between the gate of the transistor 416 and ground 358. The transistor 416 has a source adapted to be coupled to output of the power converter 108 and a drain. The transistor 418 has a drain coupled to the drain of the transistor 416, a gate coupled to the gate of the transistor 404, and a source adapted to be coupled to ground 358 through the resistor 420. The capacitor 422 is adapted to be coupled between the output of the power converter 108 and the source of the transistor 418. The switch 424 is adapted to be coupled between the source of the transistor 418 and ground 358. The logic circuit 426 has an input coupled to the drain of the transistor 418 and an output. The delay circuit 428 has an input coupled to the output of the logic circuit 426 and an output. In at least some examples, the output of the delay circuit 428 is coupled to the switch 412 and the switch 424 such that an output signal of the delay circuit 428 is provided to, and is configured to control, the switch 412 and the switch 424.

In an example of operation of the FDD circuit 206, VOUT is capacitively coupled to the transistor 416 by the capacitors 410 and 414 and to the transistor 418 by the capacitor 422. A default output of the FDD circuit 206, in at least some examples, is a logical low, or a deasserted, signal. As VOUT decreases in value, more current flows through the transistor 418 than the transistor 416. For example, the gate of the transistor 416 is held to ground 358 by the capacitor 414. As VOUT decreases in value, as received at the source of the transistor 416, current through the transistor 416 decreases. The source of the transistor 418 is held through the capacitor 422 to VOUT. Thus, as VOUT decreases in value, so too does a voltage provided at the source of the transistor 418 and a gate-to-source voltage (Vgs) of the transistor 418 increases. Responsive to Vgs of the transistor 418 increasing, current through the transistor 418 also increases and a voltage provided at the input of the logic circuit 426 begins to decrease in value from approximately VOUT toward a value approximately equal to a value of a signal provided at ground 358. Responsive to the current through the transistor 418, which is also a current provided at the input of the logic circuit 426, reaching a threshold of the logic circuit 426, the logic circuit 426 trips. In at least some examples, the logic circuit 426 implements a logical inversion. Thus, the logic circuit 426 may provide a logical high signal responsive to tripping based on current sunk through the transistor 418. In at least some examples, the output signal of the logic circuit 426 is FDD. Accordingly, in at least some examples, the output of the logic circuit 426 is coupled to an input of the clock combiner 222. The delay circuit 428 may be any suitable delay circuit that receives FDD at the input of the delay circuit 428 and provides a reset signal (RST) at the output of the delay circuit 428 after a programmed amount of time. In at least some examples, RST has a substantially same value as FDD and is configured to control the switch 412 and the switch 424 to close, resetting the FDD circuit 206. In this way, FDD is provided as a PWM signal having a frequency proportional to a rate of change of VOUT, while the rate of change of VOUT is within a range of sensitivity of the FDD circuit 206. In at least some examples, the FDD circuit 206 may be suitable for providing FDD having a frequency proportional to a rate of change of VOUT if the rate of change of VOUT is greater than about 100 microvolts (uV) per microsecond (us). In other examples, the FDD circuit 206 may be modified to provide FDD having a frequency proportional to a rate of change of VOUT if the rate of change of VOUT is some amount less than about 100 uV/us.

Figure 5A:
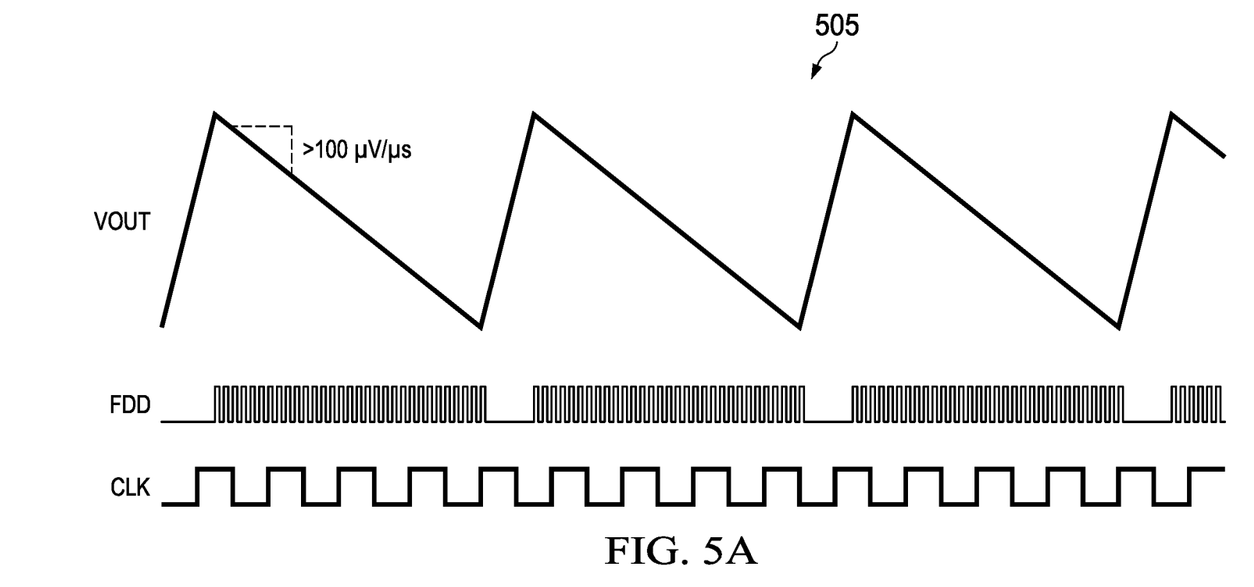
FIG. 5A is a diagram of example signal waveforms.

FIG. 5A is a diagram 505 of example signal waveforms. In at least some examples, the diagram 505 shows signals as may be provided in the SMPS 102, as described with reference to the various figures herein. The diagram 505 shows VOUT, FDD, and CLK for the SMPS 102 under a heavy load subset of light load conditions (e.g., less than about 15 mA), as described above. Assuming an inductance of the inductor of the power converter 108 of about 10 microhenries (uH), VOUT may decrease in value at a rate greater than approximately 100 uV/us. As shown by the diagram 505, as VOUT decreases in value under the heavy load conditions, FDD is asserted in repeated pulses having a frequency proportional to a rate of change of VOUT.

Figure 5B:
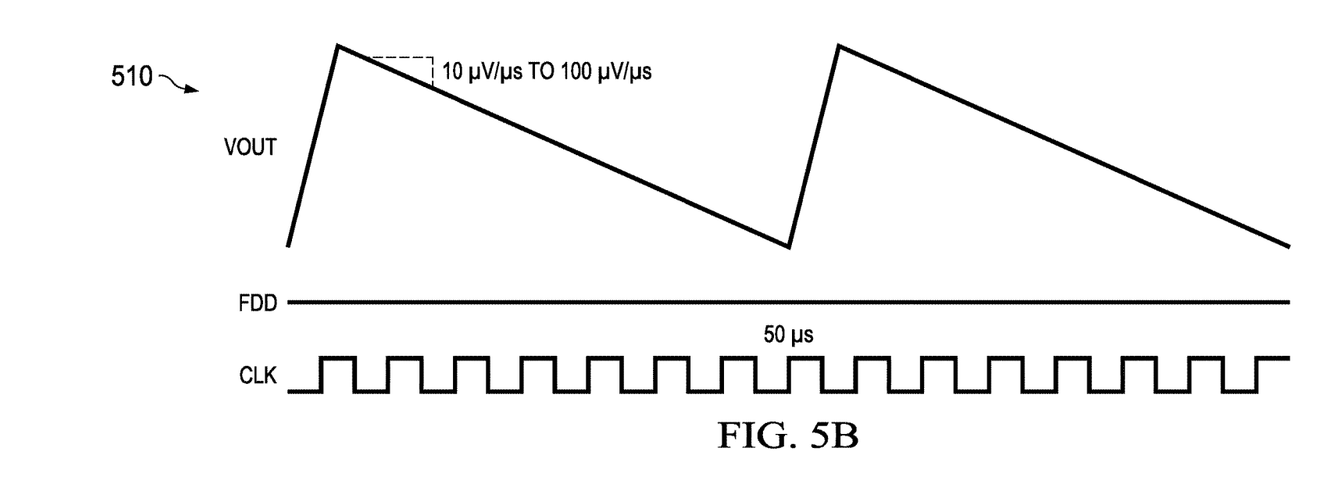
FIG. 5B is a diagram of example signal waveforms.

FIG. 5B is a diagram 510 of example signal waveforms. In at least some examples, the diagram 510 shows signals as may be provided in the SMPS 102, as described with reference to the various figures herein. The diagram 510 shows VOUT, FDD, and CLK for the SMPS 102 under a medium load subset of light load conditions (e.g., less than about 15 mA), as described above. Assuming an inductance of the inductor of the power converter 108 of about 10 uH, VOUT may decrease in value at a rate greater than approximately 10 uV/us, but less than about 100 uV/us. As shown by the diagram 510, as VOUT decreases in value under the medium load conditions, the rate of change of VOUT is insufficient to trigger FDD, causing FDD to have and maintain a logic low, or deasserted, value. To provide the controller 110 with a clock signal for instructing the controller 110 to compare the value of Vfb to the value of Vref, the controller 110 receives CLK from an oscillator. In at least some examples, CLK has a period of about 50 us. In various examples, the period of CLK may be programmed to any value that provides a suitable amount of precision in detection of variance in Vfb from Vref.

Figure 5C:
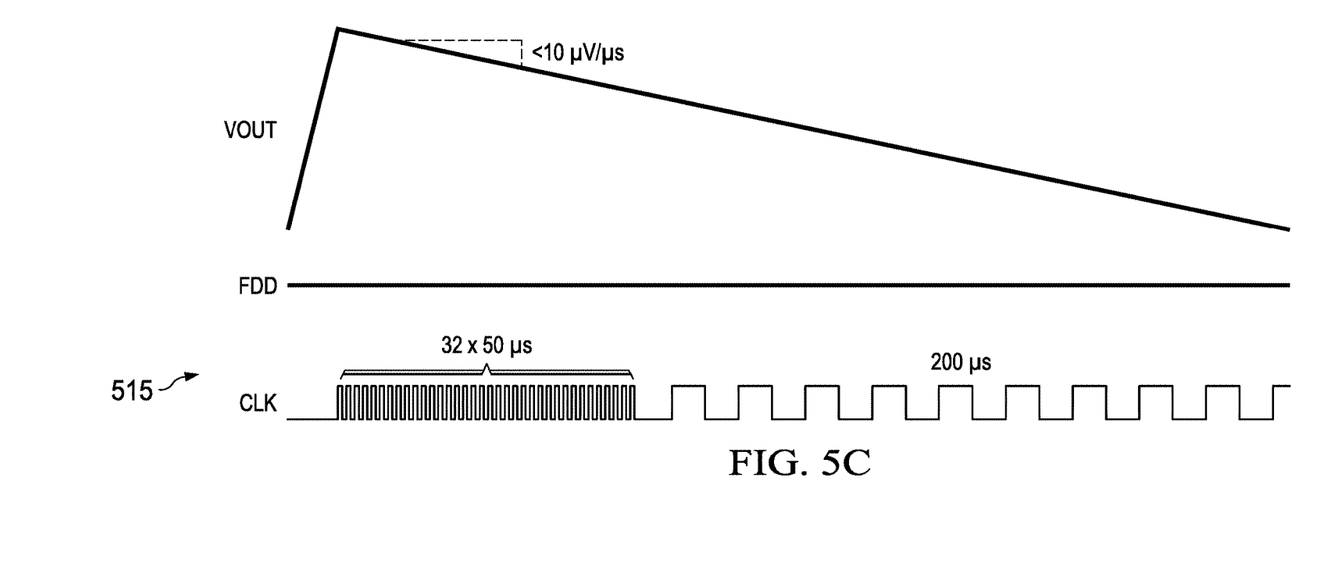
FIG. 5C is a diagram of example signal waveforms.

FIG. 5C is a diagram 515 of example signal waveforms. In at least some examples, the diagram 515 shows signals as may be provided in the SMPS 102, as described with reference to the various figures herein. The diagram 515 shows VOUT, FDD, and CLK for the SMPS 102 under a light load subset of light load conditions (e.g., less than about 15 mA), as described above. Assuming an inductance of the inductor of the power converter 108 of about 10 uH, VOUT may decrease in value at a rate less than approximately 10 uV/us. As shown by the diagram 515, as VOUT decreases in value under the light load conditions, the rate of change of VOUT is insufficient to trigger FDD, causing FDD to have and maintain a logic low, or deasserted, value. To provide the controller 110 with a clock signal for instructing the controller 110 to compare the value of Vfb to the value of Vref, the controller 110 receives CLK from an oscillator. In at least some examples, CLK has a period of about 50 us. However, if VOUT has remained in regulation for a programmed number of cycles of CLK (e.g., such as about 32, or any other value suitable for an application of the SMPS 102), the period of CLK may be increased. For example, the period of CLK may be increased from about 50 us to about 200 us. In various examples, the period of CLK may be programmed to any value that provides a suitable amount of precision in detection of variance in Vfb from Vref. In at least some examples, a component that provides CLK may track a number of cycles for which VOUT has remained in regulation and provide CLK at a frequency determined based on that tracking.

Figure 6:
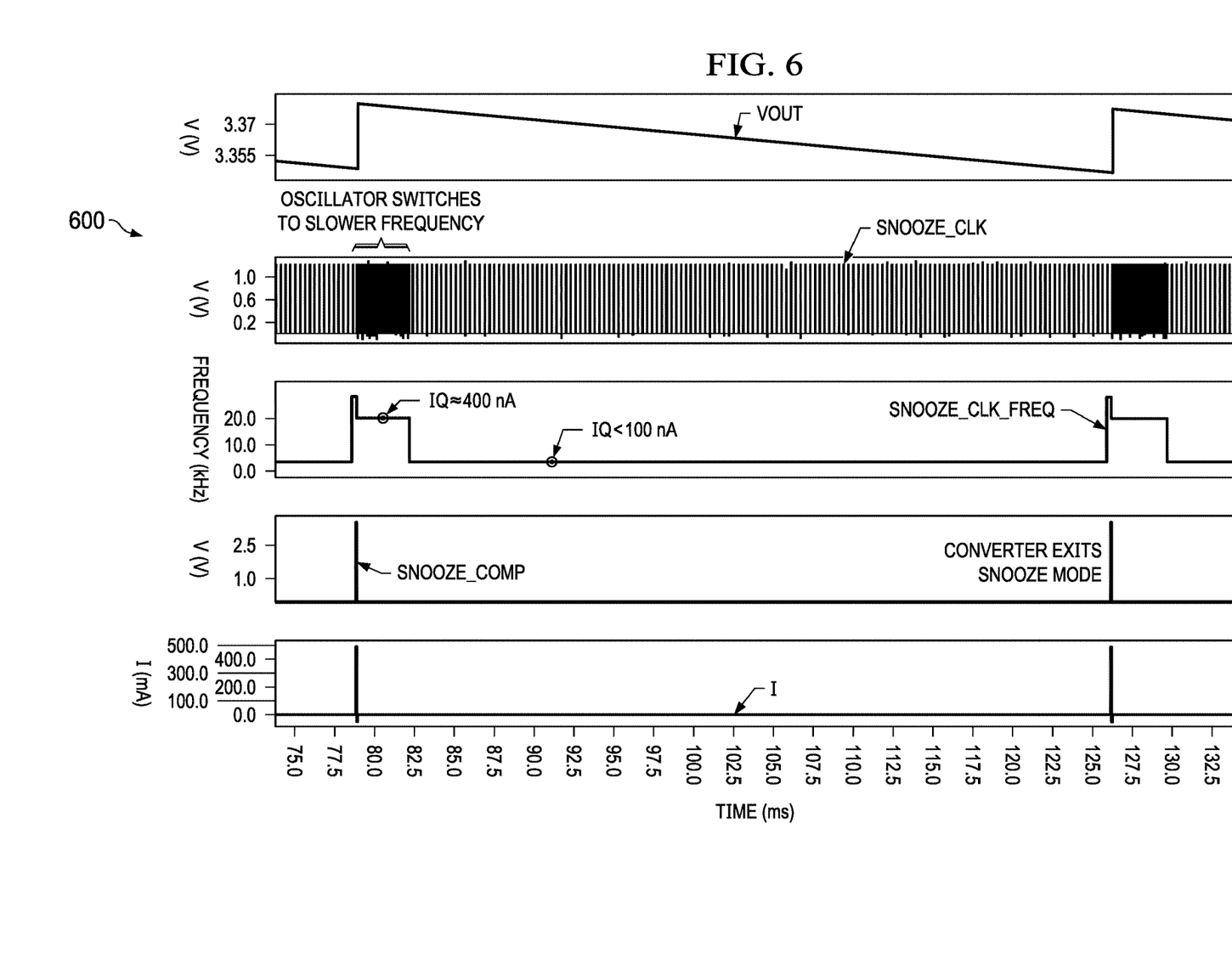
FIG. 6 is a diagram of example signal waveforms.

FIG. 6 is a diagram 600 of example signal waveforms. In at least some examples, the diagram 600 shows signals as may be provided in the SMPS 102, as described with reference to the various figures herein. The diagram 600 shows VOUT, SNOOZE_CLK, a frequency of SNOOZE_CLK (shown in the diagram 600 as SNOOZE_CLK_FREQ), an output of the comparator 224 (shown in the diagram 600 as SNOOZE_COMP), and current of the inductor of the power converter 108 (shown in the diagram 600 as I). VOUT, SNOOZE_CLK, and SNOOZE_COMP are each shown having a vertical axis representative of voltage in units of volts (V). SNOOZE_CLK_FREQ is shown having a vertical axis representative of frequency in units of kilohertz (kHz). I is shown having a vertical axis representative of current in units of mA. Each signal shown has a horizontal axis in units of milliseconds (ms).

As shown by the diagram 600, the power converter 108 is operating under light load conditions in which a load current of the power converter 108 is approximately equal to 10 microamps (uA). Under the light load conditions, SNOOZE_CLK is controlled according to CLK. As further shown by the diagram 600, responsive to SNOOZE_COMP not being asserted for a programmed number of periods of CLK (e.g., such as 32), a frequency of CLK decreases from approximately 20 kHz to approximately 3.3 kHz. In various examples, other frequencies may be used, as described above. As further shown by the diagram 600, while CLK, and therefore SNOOZE_CLK, have frequencies of about 20 kHz, a quiescent current (IQ) of the SMPS 102 may be approximately equal to 400 nanoamps (nA). However, after reducing the frequency of CLK, and therefore SNOOZE_CLK, IQ of the SMPS 102 may be reduced to be less than approximately 100 nA. As further shown by the diagram 600, responsive to assertion of SNOOZE_COMP, the SMPS 102 exits snooze mode and provides a current pulse via the power converter 108. In at least some examples, SNOOZE_COMP is asserted responsive to Vfb becoming greater in value than the scaled Vref, as described above. Following assertion of SNOOZE_COMP, CLK returns to an originally programmed frequency until the programmed number of cycles of CLK have again passed without assertion of SNOOZE_COMP, after which CLK may again be reduced in frequency to reduce IQ.

Figure 7:
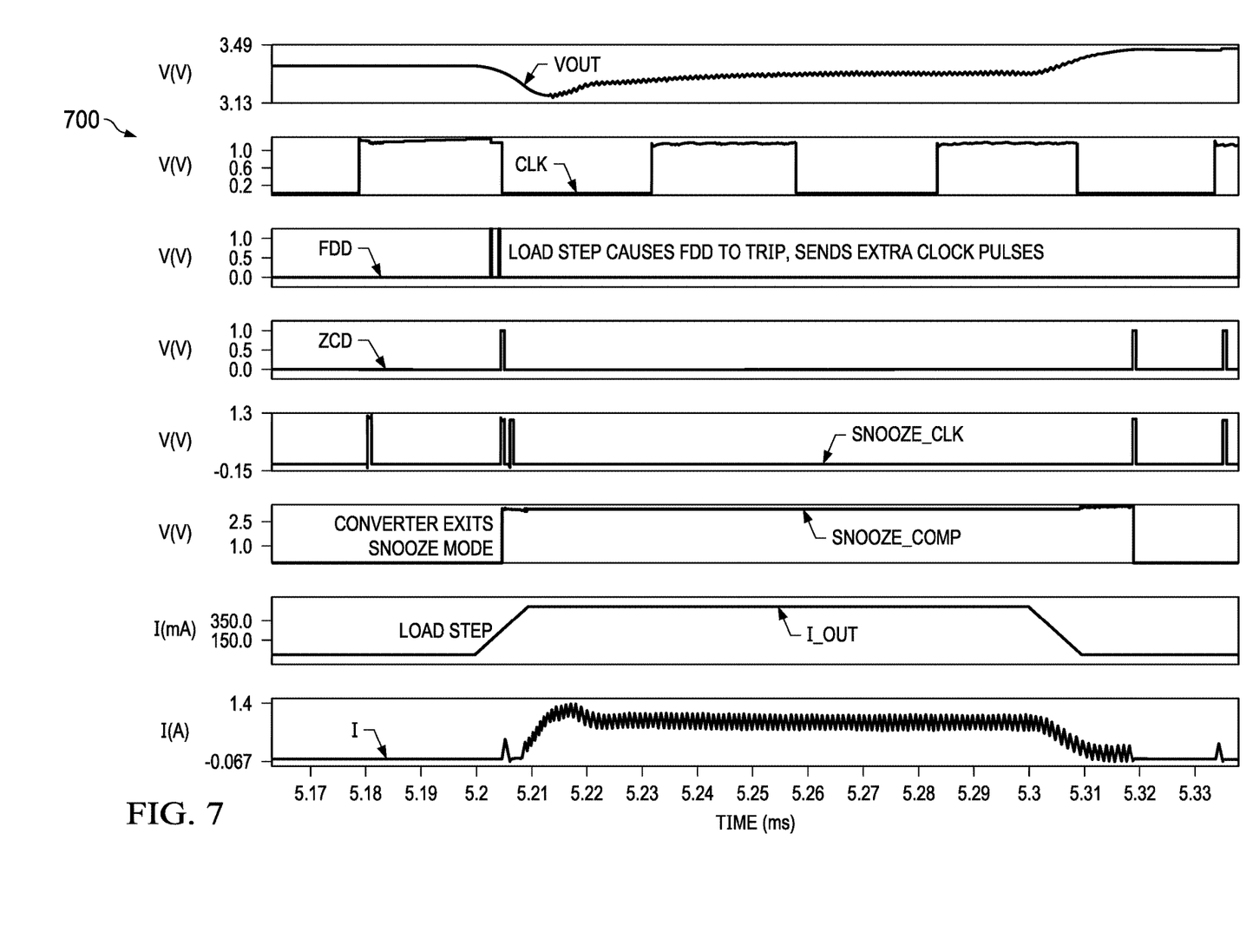
FIG. 7 is a diagram of example signal waveforms.

FIG. 7 is a diagram 700 of example signal waveforms. In at least some examples, the diagram 700 shows signals as may be provided in the SMPS 102, as described with reference to the various figures herein. The diagram 700 shows VOUT, CLK, FDD, ZCD, SNOOZE_CLK, an output of the comparator 224 (shown in the diagram 700 as SNOOZE_COMP), a current being drained by the load 106 (shown in the diagram 700 as I_out), and current of the inductor of the power converter 108 (shown in the diagram 700 as I). VOUT, CLK, FDD, SNOOZE_CLK, and SNOOZE_COMP are each shown having a vertical axis representative of voltage in units of V. I_out and I are shown having a vertical axis representative of current, with I_out in units of mA and I in units of amps (A). Each signal shown has a horizontal axis in units of ms.

As shown by the diagram 700, for each rising edge in either CLK FDD, or ZCD, a corresponding pulse appears in SNOOZE_CLK. As I_out increases suddenly in value, VOUT decreases in value causing SNOOZE_COMP to become asserted. Responsive to assertion of SNOOZE_COMP, the SMPS 102 exists the snooze mode and I increases in value to service the increased I_out. As further shown by the diagram 700, in at least some examples, a rate of change in VOUT resulting from the increased I_out causes the FDD circuit 206 to assert FDD, sending an extra clock pulse of SNOOZE_CLK.

Figure 8:
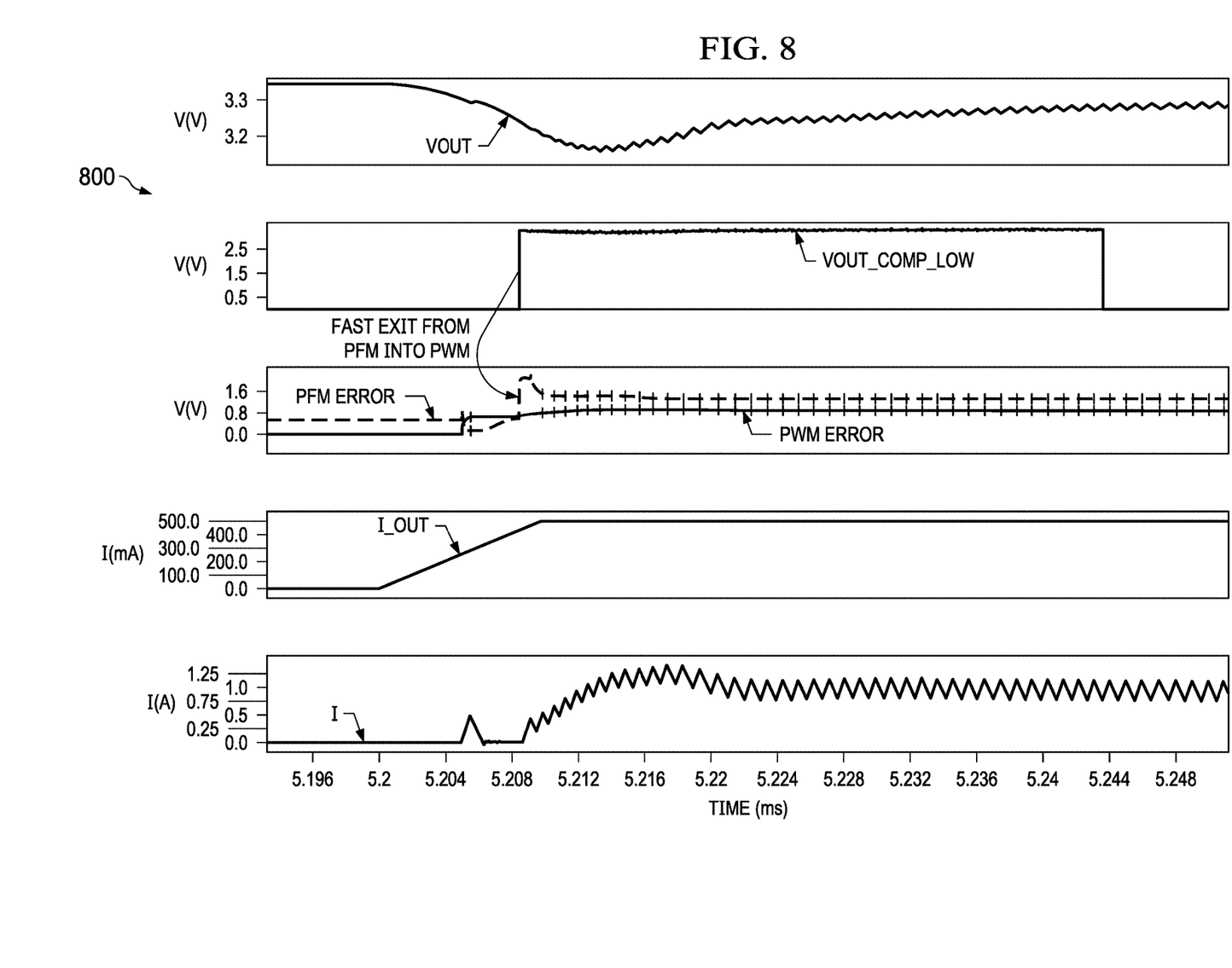
FIG. 8 is a diagram of example signal waveforms.

FIG. 8 is a diagram 800 of example signal waveforms. In at least some examples, the diagram 800 shows signals as may be provided in the SMPS 102, as described with reference to the various figures herein. The diagram 800 shows VOUT, VOUT_COMP_LOW, PWM Error, PFM Error, a current being drained by the load 106 (shown in the diagram 800 as I_out), and current of the inductor of the power converter 108 (shown in the diagram 800 as I). VOUT, VOUT_COMP_LOW, PWM Error, and PFM Error are each shown having a vertical axis representative of voltage in units of V. I_out and I are shown having a vertical axis representative of current, with I_out in units of mA and I in units of A. Each signal shown has a horizontal axis in units of ms.

As shown by the diagram 800, responsive to VOUT decreasing in value rapidly, such as caused by a rapid increase in I_out, VOUT_COMP_LOW becomes asserted. Responsive to assertion of VOUT_COMP_LOW, the SMPS 102 exists the snooze mode and I increases in value to service the increased I_out. For example, responsive to assertion of VOUT_COMP_LOW, PFM Error is asserted. Responsive to assertion of PFM Error, TOFF may have a value of zero and the controller 110 may control the power converter 108 according to the PWM mode of operation. Such control may cause IL to increase quickly in value to service the increased I_out, thereby maintaining VOUT in regulation.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor.

Uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications are possible in the described examples, and other examples are possible, within the scope of the claims.

What is claimed is:

1. Apparatus, comprising:
    a control signal generator, including:
        an error amplifier having a first output, a first input, a second input and a first snooze input;
        a first comparator having a second output, a third input and a fourth input, the third input coupled to the first output;
        a second comparator having a third output, a fifth input, a sixth input and a second snooze input, the fifth input coupled to the third input;
        a logic circuit having a fourth output and logic circuit inputs, including a first logic circuit input coupled to the second output; and
        a pulse generator having a fifth output and a seventh input, the seventh input coupled to the fourth output; and
    a snooze mode controller having a sixth output coupled to the first snooze input and the second snooze input.

2. The apparatus of claim 1, wherein the logic circuit is configured to provide a logical OR result at the fourth output responsive to signals received at the logic circuit inputs, the logic circuit inputs include second and third logic circuit inputs, the error amplifier has a seventh output, and the control signal generator includes:
    a first timer having an eighth output and an eighth input, the eighth input coupled to the third output, and the eighth output coupled to the second logic circuit input; and
    a second timer having a ninth output, a ninth input and a tenth input, the ninth input coupled to the third output, the tenth input coupled to the seventh output, and the ninth output coupled to the third logic circuit input.

3. The apparatus of claim 1, wherein the snooze mode controller includes:
    a clock combiner having a seventh output and clock combiner inputs;
    a third comparator having an eighth output, an eighth input, a ninth input and a tenth input, the tenth input coupled to the seventh output;
    a second logic circuit having a ninth output and an eleventh input, the eleventh input coupled to the eighth output; and
    a third logic circuit having a tenth output and third logic circuit inputs, a first of the third logic circuit inputs coupled to the ninth output, and the tenth output coupled to the first snooze input and the second snooze input.

4. The apparatus of claim 3, wherein the snooze mode controller is configured to:
    receive a reference voltage scaled according to a scaling factor at the eighth input,
    receive a feedback voltage at the ninth input;
    receive a zero-crossing detection signal, a clock signal and a fast drop detection signal at the clock combiner inputs;
    provide a snooze clock having a pulse responsive to a rising edge in the zero-crossing detection signal, the clock signal or the fast drop detection signal;
    perform a comparison between the scaled reference voltage and the feedback voltage responsive to a rising edge of the snooze clock; and
    provide a snooze mode control signal based on the comparison.

5. The apparatus of claim 4, wherein the apparatus is configured to decrease a quiescent current of the apparatus responsive to the snooze mode control signal.

6. The apparatus of claim 1, wherein the snooze mode controller is configured to:
    provide a snooze clock signal based on a zero-crossing detection signal, a clock signal and a fast drop detection signal, the snooze clock signal including a pulse responsive to a rising edge in the zero-crossing detection signal, the clock signal or the fast drop detection signal;
    responsive to a rising edge in the snooze clock signal, provide a snooze mode control signal responsive to whether a scaled reference voltage is greater than a feedback voltage that represents an output voltage at a load terminal;
    responsive to the snooze mode control signal changing in value, disable at least a portion of the error amplifier and the second comparator to reduce a quiescent current; and
    determining whether the scaled reference voltage is greater than the feedback voltage only responsive to rising edges in the snooze clock signal.

7. The apparatus of claim 1, wherein the first comparator is configured to receive a signal representative of a load current at the fourth input, the second comparator is configured to receive a zero voltage signal at the sixth input, and the second comparator is enabled or disabled based on a signal at the second snooze input.

8. Apparatus, comprising:
a control signal generator including an error amplifier, the control signal generator having a control output, and the error amplifier configured to provide an error signal responsive to a variance between a reference signal and a feedback signal, in which the reference signal represents a reference voltage, the feedback signal represents an output voltage at a load terminal, and the control signal generator is configured to:
provide a comparison result responsive to whether the error signal is greater than a signal that represents a load current at a load terminal; and
provide a control signal at a control output based on the comparison result; and
a snooze mode controller configured to disable at least a portion of the error amplifier responsive to the reference voltage being greater than the output voltage.

9. The apparatus of claim 8, wherein the snooze mode controller is configured to provide a snooze clock, and the snooze clock has a signal pulse responsive to each of:
a rising edge of a zero-crossing detection signal, which is asserted responsive to the load current decreasing to zero;
a rising edge of a clock signal having a fixed frequency; and
a rising edge of a fast drop detection signal, in which the fast drop detection signal has a frequency proportional to a rate of change of the output voltage.

10. The apparatus of claim 9, wherein the snooze mode controller is configured to: perform a comparison between the reference signal and the feedback signal responsive to a rising edge of the snooze clock; and provide a snooze comparison result responsive to the comparison.

11. The apparatus of claim 10, wherein the fixed frequency is decreased responsive to the snooze comparison result having a particular value for a particular number of periods of the clock signal.

12. The apparatus of claim 10, wherein the snooze mode controller is configured to disable at least the portion of the error amplifier responsive to a change in the snooze comparison result.

13. The apparatus of claim 12, wherein the control signal generator is configured to cause a burst of current at the load terminal responsive to a particular value of the snooze comparison result.

14. The apparatus of claim 9, wherein a frequency of the snooze clock is variable based on a rate of change of the output voltage.

15. A system, comprising:
a power converter having a power source terminal, a load terminal and a control input, the power converter configured to switch power from the power source terminal to the load terminal responsive to a control signal at the control input; and
a controller including:
a control signal generator including an error amplifier, the control signal generator having a control output coupled to the control input, and the error amplifier configured to provide an error signal responsive to a variance between a reference signal and a feedback signal, in which the reference signal represents a reference voltage, the feedback signal represents an output voltage at the load terminal, and the control signal generator is configured to:
provide a comparison result responsive to whether the error signal is greater than a signal that represents a load current at the load terminal; and
provide the control signal at the control output based on the comparison result; and
a snooze mode controller configured to disable at least a portion of the error amplifier responsive to the reference voltage being greater than the output voltage.

16. The system of claim 15, wherein the snooze mode controller is configured to provide a snooze clock, and the snooze clock has a signal pulse responsive to each of:
a rising edge of a zero-crossing detection signal, which is asserted responsive to the load current decreasing to zero;
a rising edge of a clock signal having a fixed frequency; and
a rising edge of a fast drop detection signal, in which the fast drop detection signal has a frequency proportional to a rate of change of the output voltage.

17. The system of claim 16, wherein the snooze mode controller is configured to: perform a comparison between the reference signal and the feedback signal responsive to a rising edge of the snooze clock; and provide a snooze comparison result responsive to the comparison.

18. The system of claim 17, wherein the snooze mode controller is configured to disable at least the portion of the error amplifier responsive to a change in the snooze comparison result.

19. The system of claim 18, wherein the controller is configured to reduce a quiescent current consumed by the controller, responsive to a first value of the snooze comparison result.

20. The system of claim 18, wherein the power converter is configured to provide a burst of current at the load terminal responsive to a second value of the snooze comparison result.

* * * * *